United States Patent
Kido et al.

(10) Patent No.: US 12,359,123 B2
(45) Date of Patent: Jul. 15, 2025

(54) SEMICONDUCTOR NANOPARTICLE COMPLEX, SEMICONDUCTOR NANOPARTICLE COMPLEX DISPERSION LIQUID, SEMICONDUCTOR NANOPARTICLE COMPLEX COMPOSITION, SEMICONDUCTOR NANOPARTICLE COMPLEX CURED FILM, AND PURIFICATION METHOD FOR SEMICONDUCTOR NANOPARTICLE COMPLEX

(71) Applicant: SHOEI CHEMICAL INC., Tokyo (JP)

(72) Inventors: Makoto Kido, Tosu (JP); Takafumi Moriyama, Tosu (JP); Hirokazu Sasaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 783 days.

(21) Appl. No.: 17/596,489

(22) PCT Filed: Jun. 5, 2020

(86) PCT No.: PCT/JP2020/022373
§ 371 (c)(1),
(2) Date: Dec. 10, 2021

(87) PCT Pub. No.: WO2020/250833
PCT Pub. Date: Dec. 17, 2020

(65) Prior Publication Data
US 2022/0235264 A1 Jul. 28, 2022

(30) Foreign Application Priority Data
Jun. 13, 2019 (JP) .................. 2019-110306

(51) Int. Cl.
| | |
|---|---|
| C09K 11/70 | (2006.01) |
| B82Y 20/00 | (2011.01) |
| B82Y 30/00 | (2011.01) |
| B82Y 40/00 | (2011.01) |
| C01G 9/00 | (2006.01) |
| C01G 15/00 | (2006.01) |
| C09K 11/02 | (2006.01) |
| C09K 11/88 | (2006.01) |

(52) U.S. Cl.
CPC ............... *C09K 11/70* (2013.01); *C01G 9/00* (2013.01); *C01G 15/00* (2013.01); *C09K 11/02* (2013.01); *C09K 11/703* (2013.01); *C09K 11/883* (2013.01); *B82Y 20/00* (2013.01); *B82Y 30/00* (2013.01); *B82Y 40/00* (2013.01); *C01P 2004/64* (2013.01); *C01P 2004/80* (2013.01); *C01P 2006/60* (2013.01)

(58) Field of Classification Search
CPC ....... C09K 11/70; C09K 11/02; C09K 11/703; C09K 11/883
See application file for complete search history.

(56) References Cited

U.S. PATENT DOCUMENTS

2008/0308130 A1   12/2008   Scher et al.

FOREIGN PATENT DOCUMENTS

| | | | |
|---|---|---|---|
| CN | 108624320 | * | 10/2018 |
| CN | 108624320 | A | 10/2018 |
| CN | 112912460 | A | 6/2021 |
| JP | 2002121549 | A | 4/2002 |
| JP | 2002162501 | A | 6/2002 |
| JP | 2009216603 | A | 9/2009 |
| JP | 2019073705 | A | 5/2019 |
| KR | 1020180106126 | A | 10/2018 |
| KR | 1020180135063 | A | 12/2018 |
| WO | 2017038487 | A1 | 3/2017 |
| WO | 2017150297 | A1 | 9/2017 |
| WO | 2019008374 | A1 | 1/2019 |
| WO | WO 2020/078843 | * | 4/2020 |

OTHER PUBLICATIONS

China National Intellectual Property Administration, Office action issued in Chinese Application No. 202080043463.X, Mar. 10, 2023, 22 pages.
Korean Intellectual Property Office, Office Action Issued in Application No. 10-2021-7042425, Aug. 2, 2024, Korea, 19 Pages.

* cited by examiner

Primary Examiner — C Melissa Koslow
(74) Attorney, Agent, or Firm — Alleman Hall & Tuttle LLP

(57) ABSTRACT

Provided is a semiconductor nanoparticle complex in which a ligand is coordinated to a surface of a semiconductor nanoparticle. The semiconductor nanoparticle includes In and P, the ligand includes a mercapto fatty acid ester represented by the following general formula, and the mercapto fatty acid ester has an SP value of 9.30 or less. General formula: $HS-R_1-COOR_2$ (where $R_1$ is a $C_{1-11}$ hydrocarbon group and $R_2$ is a $C_{1-30}$ hydrocarbon group). The present invention can provide a semiconductor nanoparticle complex that keeps high fluorescence quantum yield before and after purification.

12 Claims, No Drawings

SEMICONDUCTOR NANOPARTICLE COMPLEX, SEMICONDUCTOR NANOPARTICLE COMPLEX DISPERSION LIQUID, SEMICONDUCTOR NANOPARTICLE COMPLEX COMPOSITION, SEMICONDUCTOR NANOPARTICLE COMPLEX CURED FILM, AND PURIFICATION METHOD FOR SEMICONDUCTOR NANOPARTICLE COMPLEX

TECHNICAL FIELD

The present invention relates to a semiconductor nanoparticle complex.

BACKGROUND ART

Semiconductor nanoparticles small enough to exhibit quantum confinement effects have a bandgap (Quantum Dot, QD) dependent on the particle size. An exciton formed in a semiconductor nanoparticle by such means as photoexcitation or charge injection emits a photon having energy depending on the bandgap due to recombination. Emission having a desired wavelength therefore can be obtained by selecting the composition of semiconductor nanoparticles and their particle size as appropriate.

Early research on semiconductor nanoparticles focused on elements including Cd and Pb. However, since Cd and Pb are substances under regulations such as Restriction on Hazardous Substances, more recent studies have shifted to non-Cd or non-Pb semiconductor nanoparticles.

Semiconductor nanoparticles find various applications such as displays, biological labeling, and solar cells. As for display applications, it is expected to be used in QD films, QD patterning, and self-illuminating devices (QLED), for example.

CITATION LIST

Patent Literature

Patent Literature 1: United States Patent Application Publication No. 2008/0308130
Patent Literature 2: Japanese Patent Application Laid-open No. 2002-121549

SUMMARY OF INVENTION

Technical Problem

Semiconductor nanoparticles and a semiconductor nanoparticle complex are dispersed in a dispersion medium and thereby prepared as a dispersion liquid to be applied in various fields. In particular, in applications in the display field, such as QD films, QD patterning, and self-illuminating devices (quantum-dot light emitting diodes (QLEDs)), nonpolar semiconductor nanoparticles are most widely used with hexane or octane as a good solvent (dispersion medium having high solubility) and acetone or ethanol as a poor solvent (dispersion medium having low solubility). Such nonpolar semiconductor nanoparticles are purified by repeating the operation of dispersing nanoparticles in a good solvent after synthesis and then precipitating them in a poor solvent, as disclosed in Patent Literature 1. In the purification step of nonpolar semiconductor nanoparticles, since the poor solvent for nonpolar semiconductor nanoparticles is a polar solvent, the fluorescence quantum yield tends to be deteriorated due the effects of water content and the like.

Semiconductor nanoparticles include Group II-VI semiconductor nanoparticles known as CdSe-based nanoparticles and Group III-V semiconductor nanoparticles known as InP-based nanoparticles. In order to achieve high fluorescence quantum yield, these semiconductor nanoparticles sometimes have a core-shell structure in which the semiconductor nanoparticles listed above are core particles and shells are formed on the surfaces of the core particles. In view of the quantum confinement effects, Group II-VI semiconductors such as ZnSe and ZnS are mainly used for shells. When the cores are Group II-VI core particles, epitaxial growth is easy and uniform shells can be formed because the elements forming shells have the same valency as the core particles. On the other hand, when the cores are Group III-V core particles, it is difficult to form uniform shells because the elements forming shells have a valency different from the core particles. This also affects the resistance of semiconductor nanoparticles against purification. As previously mentioned, while non-Cd semiconductor nanoparticles have been researched in recent years, Group III-V/Group II-VI core-shell type semiconductor nanoparticles are less resistant against purification, compared with Group II-VI/Group II-VI core-shell type semiconductor nanoparticles, and the fluorescence quantum yield is deteriorated after purification.

When cured films such as QD films and QD patterning are formed, any curing method can be used for curing the dispersion liquid. However, when the curing method is thermal curing, heat is applied to a dispersion liquid of the semiconductor nanoparticle complex, and the semiconductor nanoparticles and the semiconductor nanoparticle complex therefore require heat resistance. Thus, the semiconductor nanoparticle complex sometimes requires high heat resistance in addition to resistance against purification.

In order to solve the problems above, a first object of the present invention is to provide a semiconductor nanoparticle complex having dispersibility in a nonpolar organic solvent and keeping high fluorescence quantum yield (QY) before and after purification. Another object of the present invention is to provide a semiconductor nanoparticle complex having high dispersibility in a nonpolar organic solvent, in addition to having dispersibility in a nonpolar organic solvent and keeping high fluorescence quantum yield (QY) before and after purification. Another object of the present invention is to provide a semiconductor nanoparticle complex having high heat resistance, in addition to having dispersibility in a nonpolar organic solvent and keeping high fluorescence quantum yield (QY) before and after purification. Another object of the present invention is to provide a semiconductor nanoparticle complex keeping high fluorescence quantum yield (QY) before and after purification, having high dispersibility in a nonpolar organic solvent, and having high heat resistance.

Solution to Problem

Specifically, the present invention (1) provides a semiconductor nanoparticle complex comprising a ligand coordinated to a surface of a semiconductor nanoparticle. The semiconductor nanoparticle includes In and P. The ligand includes a mercapto fatty acid ester represented by the following general formula (1). The mercapto fatty acid ester has an SP value of 9.30 or less.

General formula (1):

$$HS-R_1-COOR_2 \qquad (1)$$

(where $R_1$ is a $C_{1-11}$ hydrocarbon group and $R_2$ is a $C_{1-30}$ hydrocarbon group).

The present invention (2) provides the semiconductor nanoparticle complex according to (1), in which in the general formula (1), $R_1$ is a $C_{1-11}$ hydrocarbon group and $R_2$ is a $C_{1-20}$ hydrocarbon group, the mercapto fatty acid ester represented by the general formula (1) has an SP value of 9.30 or less, and an amount of the mercapto fatty acid ester represented by the general formula (1) contained in the entire ligand is 40.0 mol % or more.

The present invention (3) provides the semiconductor nanoparticle complex according to (2), in which in the general formula (1), $R_1$ is a $C_{1-11}$ alkylene group and $R_2$ is a $C_{1-20}$ alkyl group.

The present invention (4) provides the semiconductor nanoparticle complex according to (2) or (3), in which the mercapto fatty acid ester represented by the general formula (1) has a molecular weight of 400 or less.

The present invention (5) provides the semiconductor nanoparticle complex according to (2) or (3), in which the mercapto fatty acid ester represented by the general formula (1) has a molecular weight of 300 or less.

The present invention (6) provides the semiconductor nanoparticle complex according to any one of (2) to (5), in which a mass ratio of the ligand to the semiconductor nanoparticle (the ligand/the semiconductor nanoparticle) is 0.50 or less.

The present invention (7) provides the semiconductor nanoparticle complex according to any one of (2) to (6), in which a mass ratio of the ligand to the semiconductor nanoparticle (the ligand/the semiconductor nanoparticle) is 0.40 or less.

The present invention (8) provides the semiconductor nanoparticle complex according to (1), in which in the general formula (1), $R_1$ is a $C_{1-11}$ hydrocarbon group and $R_2$ is a $C_{14-30}$ hydrocarbon group, and the mercapto fatty acid ester represented by the general formula (1) has an SP value of 9.00 or less.

The present invention (9) provides the semiconductor nanoparticle complex according to (8), in which in a heat resistance test in the air at 180° C. for five hours, a rate of change of fluorescence quantum yield after the heat resistance test to fluorescence quantum yield before the heat resistance test of the semiconductor nanoparticle complex ((1−(fluorescence quantum yield after the heat resistance test/fluorescence quantum yield before the heat resistance test))×100) is less than 10%.

The present invention (10) provides the semiconductor nanoparticle complex according to (8) or (9), in which an amount of the mercapto fatty acid ester represented by the general formula (1) contained in the entire ligand is 40.0 mol % or more.

The present invention (11) provides the semiconductor nanoparticle complex according to any one of (8) to (10), in which in the general formula (1), $R_1$ is a $C_{1-11}$ alkylene group and $R_2$ is a $C_{14-30}$ alkyl group.

The present invention (12) provides the semiconductor nanoparticle complex according to any one of (8) to (11), in which the mercapto fatty acid ester represented by the general formula (1) has a molecular weight of 300 to 450.

The present invention (13) provides the semiconductor nanoparticle complex according to any one of (1) to (12), in which the semiconductor nanoparticle is a core-shell type semiconductor nanoparticle having a core containing In and P as main components and one or more layers of shells.

The present invention (14) provides the semiconductor nanoparticle complex according to (13), in which at least one of the shells is formed of ZnSe.

The present invention (15) provides the semiconductor nanoparticle complex according to (13) or (14), in which the shells are two or more layers, and an outermost layer of the shells is formed of ZnS.

The present invention (16) provides the semiconductor nanoparticle complex according to any one of (13) to (15), in which the shells at least include a first shell formed of ZnSe and covering an outer surface of the core and a second shell formed of ZnS and covering an outer surface of the first shell.

The present invention (17) provides the semiconductor nanoparticle complex according to any one of (1) to (16), in which an average SP value of the ligand coordinated to the semiconductor nanoparticle is 9.3 or less.

The present invention (18) provides the semiconductor nanoparticle complex according to any one of (1) to (17), in which the ligand further includes an aliphatic ligand.

The present invention (19) provides the semiconductor nanoparticle complex according to (18), in which the aliphatic ligand comprises one or more kinds selected from the group consisting of aliphatic thiols, aliphatic carboxylic acids, and aliphatic phosphines.

The present invention (20) provides the semiconductor nanoparticle complex according to any one of (1) to (19), in which an amount of the mercapto fatty acid ester represented by the general formula (1) contained in the ligand is 50.0 mol % or more.

The present invention (21) provides the semiconductor nanoparticle complex according to any one of (1) to (20), in which an amount of the mercapto fatty acid ester represented by the general formula (1) contained in the ligand is 60.0 mol % or more.

The present invention (22) provides the semiconductor nanoparticle complex according to any one of (1) to (21), in which a rate of change of fluorescence quantum yield after purification to fluorescence quantum yield before purification of the semiconductor nanoparticle complex ((1−(fluorescence quantum yield after purification/fluorescence quantum yield before purification))×100) is less than 20%.

The present invention (23) provides the semiconductor nanoparticle complex according to any one of (1) to (22), in which a rate of change of fluorescence quantum yield after purification to fluorescence quantum yield before purification of the semiconductor nanoparticle complex ((1−(fluorescence quantum yield after purification/fluorescence quantum yield before purification))×100) is less than 10%.

The present invention (24) provides the semiconductor nanoparticle complex according to any one of (1) to (23), in which fluorescence quantum yield after purification of the semiconductor nanoparticle complex is 80% or higher.

The present invention (25) provides the semiconductor nanoparticle complex according to any one of (1) to (24), in which a full width at half maximum of an emission spectrum of the semiconductor nanoparticle complex is 38 nm or less.

The present invention (26) provides a purification method including aggregating the semiconductor nanoparticle complex according to any one of (1) to (25) using a poor solvent and subsequently separating the semiconductor nanoparticle complex.

The present invention (27) provides a semiconductor nanoparticle complex dispersion liquid comprising the semiconductor nanoparticle complex according to any one of (1) to (25) dispersed in an organic dispersion medium.

The present invention (28) provides a semiconductor nanoparticle complex composition comprising the semiconductor nanoparticle complex according to any one of (1) to (25) dispersed in a dispersion medium, in which the dispersion medium is a monomer or a prepolymer.

The present invention (29) provides a semiconductor nanoparticle complex cured film comprising the semiconductor nanoparticle complex according to any one of (1) to (25) dispersed in a polymer matrix.

In the subject application, the range denoted by "to" is a range in which both the starting and ending values are inclusive.

Advantageous Effects of Invention

The present invention can provide a semiconductor nanoparticle complex having dispersibility in a nonpolar organic solvent and keeping high fluorescence quantum yield (QY) before and after purification. The present invention can also provide a semiconductor nanoparticle complex having high dispersibility in a nonpolar organic solvent, in addition to having dispersibility in a nonpolar organic solvent and keeping high fluorescence quantum yield (QY) before and after purification. The present invention can also provide a semiconductor nanoparticle complex having high heat resistance, in addition to having dispersibility in a nonpolar organic solvent and keeping high fluorescence quantum yield (QY) before and after purification. The present invention can also provide a semiconductor nanoparticle complex keeping high fluorescence quantum yield (QY) before and after purification, having high dispersibility in a nonpolar organic solvent, and having high heat resistance.

DESCRIPTION OF EMBODIMENTS (Semiconductor Nanoparticle Complex)

The present invention relates to a semiconductor nanoparticle complex in which ligands are coordinated to a surface of a semiconductor nanoparticle. In the present invention, the semiconductor nanoparticle complex refers to a semiconducting nanoparticle complex having luminous properties. The semiconductor nanoparticle complex according to the present invention is a particle that absorbs light of 340 nm to 480 nm and emits light having an emission peak wavelength of 400 nm to 750 nm.

The semiconductor nanoparticle complex according to the present invention is a semiconductor nanoparticle complex in which a ligand is coordinated to a surface of a semiconductor nanoparticle. The semiconductor nanoparticle includes In and P. The ligand includes a mercapto fatty acid ester represented by the following general formula (1):

HS—$R_1$—COO$R_2$     (1)

(where $R_1$ is a $C_{1-11}$ hydrocarbon group and $R_2$ is $C_{1-30}$ hydrocarbon group). The mercapto fatty acid ester represented by the general formula (1) has an SP value of 9.30 or less.

The semiconductor nanoparticle complex according to the present invention has a semiconductor nanoparticle and a ligand coordinated to a surface of the semiconductor nanoparticle.

The semiconductor nanoparticle complex according to the present invention can retain high fluorescence quantum yield before and after purification. More specifically, the semiconductor nanoparticle complex according to the present invention has high fluorescence quantum yield before purification and has high fluorescence quantum yield even after purification, and the rate of change of fluorescence quantum yield before and after purification is small.

The full width at half maximum (FWHM) of an emission spectrum of the semiconductor nanoparticle complex according to the present invention is preferably 38 nm or less, further preferably 35 nm or less, both before purification and after purification. In particular, with the full width at half maximum of the emission spectrum of the semiconductor nanoparticle complex according to the present invention after purification falling within the range above, color mixture can be reduced when the semiconductor nanoparticle complex is applied to displays and the like.

The fluorescence quantum yield (QY) of the semiconductor nanoparticle complex according to the present invention is preferably 80% or higher, and more preferably 85% or higher both before purification and after purification. In particular, with the fluorescence quantum yield of the semiconductor nanoparticle complex according to the present invention after purification of 80% or higher, color conversion can be performed more efficiently when the semiconductor nanoparticle complex is used in applications. In the present invention, the fluorescence quantum yield of the semiconductor nanoparticle complex can be determined using a quantum yield measurement system.

In the present invention, the optical properties of the semiconductor nanoparticle complex can be determined using a quantum yield measurement system. The semiconductor nanoparticle complex is dispersed in a dispersion liquid and irradiated with excitation light to obtain an emission spectrum. The re-excitation fluorescence emission spectrum of re-excited fluorescence emission is eliminated from the obtained emission, and the fluorescence quantum yield (QY) and the full width at half maximum (FWHM) are calculated from the emission spectrum after the re-excitation correction. Examples of the dispersion liquid include n-hexane.

Semiconductor Nanoparticle—

The semiconductor nanoparticle composing the semiconductor nanoparticle complex according to the present invention, that is, a particle to which a ligand is coordinated contains a Group III element and a Group V element. In particular, the semiconductor nanoparticle preferably contains In and P in view of luminous properties and safety.

It is preferable that the semiconductor nanoparticle be a core-shell type semiconductor nanoparticle in which a semiconductor nanoparticle containing In and P is a core particle with one or more layers of shells, in view of the quantum confinement effects. It is further preferable that the core-shell type semiconductor nanoparticle have two or more layers of shells. The shells preferably include a shell of a composition containing Zn and Se, and at least one of the shells is preferably formed of ZnSe. When the core-shell type semiconductor nanoparticle has two or more layers of shells, the outermost layer is preferably a shell of a composition containing Zn and S, and further preferably formed of ZnS. In particular, when the shells at least include a first shell formed of ZnSe and covering an outer surface of the core particle and a second shell formed of ZnS and covering an outer surface of the first shell, the fluorescence quantum yield can be enhanced.

The composition in the shells is not necessarily a stoichiometric composition unless the advantageous effect of the present invention is impaired, and may include an element other than Zn, Se, and S in each shell or may have one or more gradient-type shells in which the ratio of an element composing the shell varies in the shell.

In the present invention, whether the shell covers at least a part of the core and the elemental distribution in the shell can be determined, for example, by compositional analysis using energy dispersive X-ray spectroscopy (TEM-EDX) using a transmission electron microscope.

An exemplary method of producing semiconductor nanoparticles will be disclosed below.

The core of a semiconductor nanoparticle can be formed by mixing an In precursor, a P precursor, and an additive, if necessary, in a solvent and heating the resultant precursor mixture.

A coordinating solvent or a non-coordinating solvent is used as the solvent. Examples of the solvent include 1-octadecene, hexadecane, squalane, oleylamine, trioctylphosphine, and trioctylphosphine oxide.

Examples of the In precursor include, but not limited to, acetates, carboxylates, and halides containing the In.

Examples of the P precursor include, but not limited to, organic compounds and gases including the P. When the precursor is gas, the core can be formed by allowing the precursor mixture excluding the gas to react while injecting the gas.

The semiconductor nanoparticle may include one or more kinds of elements other than In and P as long as the advantageous effects of the present invention are not impaired, and in this case, the precursor of the element is added when the core is formed.

Examples of the additive include, but not limited to, dispersants such as carboxylic acids, amines, thiols, phosphines, phosphine oxides, phosphinic acids, and phosphonic acids. The dispersant may also serve as a solvent.

After the core of the semiconductor nanoparticle is formed, a halide can be added, if necessary, to improve the luminous properties of the semiconductor nanoparticle.

In an embodiment, a metal precursor solution including an In precursor, and, if necessary, a dispersant added in a solvent is mixed under vacuum and temporarily heated at 100° C. to 300° C. for 6 hours to 24 hours. Subsequently, a P precursor is added, and the mixture is heated at 200° C. to 400° C. for 3 minutes to 60 minutes and thereafter cooled. Furthermore, a halogen precursor is added, and the mixture is heated at 25° C. to 300° C., preferably 100° C. to 300° C., and more preferably 150° C. to 280° C., resulting in a core particle dispersion liquid including core particles.

To the synthesized core particle dispersion liquid, a shell-forming precursor is added, whereby the semiconductor nanoparticle attains a core-shell structure, and the fluorescence quantum yield (QY) and the stability can be enhanced.

The element forming the shell presumably takes a structure such as an alloy or hetero structure or an amorphous structure on the surface of the core particle but may partially move to the interior of the core particle by diffusion.

The added shell-forming element is mainly present in the vicinity of the surface of the core particle and plays a role of protecting the semiconductor nanoparticle from external factors. In the core-shell structure of the semiconductor nanoparticle, the shell preferably covers at least a part of the core, and further preferably uniformly covers the entire surface of the core particle.

In an embodiment, after a Zn precursor and a Se precursor are added to the core particle dispersion liquid, the dispersion liquid is heated at 150° C. to 300° C., and preferably at 180° C. to 250° C., and thereafter a Zn precursor and a S precursor are added, and the dispersion liquid is heated at 200° C. to 400° C., and preferably at 250° C. to 350° C. The core-shell type semiconductor nanoparticle thus can be obtained.

As the Zn precursor, carboxylates such as zinc acetate, zinc propionate, and zinc myristate, halides such as zinc chloride and zinc bromide, organic salts such as diethyl zinc, and the like can be used although not limited thereto.

As the Se precursor, phosphine selenides such as tributylphosphine selenide, trioctylphosphine selenide, and tris(trimethylsilyl)phosphine selenide, selenols such as benzeneselenol and selenocysteine, a selenium/octadecene solution, and the like can be used.

As the S precursor, phosphine sulfides such as tributylphosphine sulfide, trioctylphosphine sulfide, and tris(trimethylsilyl)phosphine sulfide, thiols such as octanethiol, dodecanethiol, and octadecanethiol, a sulfur/octadecene solution, and the like can be used.

The precursors of the shell may be mixed in advance and added at one time or multiple times or may be added separately at one time or separately multiple times. When the shell precursors are added multiple times, the temperature may be changed for heating after each addition of the shell precursors.

In the present invention, the method of preparing semiconductor nanoparticles is not limited. Besides the method described above, conventional production methods such as hot injection, a homogeneous solvent method, an inverse micelle method, and CVD, or any methods may be employed.

—Ligand—

In the semiconductor nanoparticle complex according to the present invention, a ligand is coordinated to the surface of the semiconductor nanoparticle. As used herein coordination means that a ligand chemically affects the surface of the semiconductor nanoparticle. A ligand may be bonded to the surface of the semiconductor nanoparticle by coordinate bonding or any other forms of bonding (for example, covalent bonding, ionic bonding, or hydrogen bonding), or the bond is not necessarily formed when at least a part of the surface of the semiconductor nanoparticle has a ligand.

In the semiconductor nanoparticle complex according to the present invention, the ligand coordinated to the semiconductor nanoparticle includes a mercapto fatty acid ester represented by the following general formula (1).

General formula (1):

$$\text{HS}-R_1-\text{COOR}_2 \tag{1}$$

In general formula (1), $R_1$ is a $C_{1-11}$ hydrocarbon group and $R_2$ is a $C_{1-30}$ hydrocarbon group. In general formula (1), examples of $R^1$ include, but not limited to, an alkylene group. The alkylene group may have a branched structure. In general formula (1), examples of $R_2$ include, but not limited to, a $C_{1-20}$ hydrocarbon group, a $C_{14-30}$ hydrocarbon group, and a $C_{14-20}$ hydrocarbon group, and more specifically include an alkyl group, an alkenyl group, and an alkynyl group. The alkyl group, the alkenyl group, and the alkynyl group may have a branched structure. When $R_1$ and $R_2$ in general formula (1) are those described above, the rate of change of the fluorescence quantum yield after purification to that before purification of the semiconductor nanoparticle complex is reduced. The mercapto fatty acid ester represented by general formula (1) may be a single kind or may be a combination of two or more kinds.

As disclosed in Patent Literature 2, the mercapto fatty acid ester is used as a ligand that enables dispersion of semiconductor nanoparticles in a polar solvent. In the present invention, the inventors have found that the mercapto fatty acid ester represented by general formula (1) is coordinated to the semiconductor nanoparticle whereby the dispersibility in a nonpolar solvent is kept, the initial fluorescence quantum yield is high, and the rate of change of the fluorescence quantum yield after purification to that before purification can be reduced.

In the semiconductor nanoparticle complex according to the present invention, the mercapto fatty acid ester represented by general formula (1) has an SP value of 9.30 or less. With the SP value of the mercapto fatty acid ester of 9.30 or less, the semiconductor nanoparticles can be dispersed at a high mass fraction in a nonpolar solvent.

The SP value of the ligand can be determined by calculation using the Y-MB method.

In the semiconductor nanoparticle complex according to the present invention, it is preferable that in the mercapto fatty acid ester represented by general formula (1), $R_1$ be a $C_{1-11}$ alkylene group and $R_2$ is a $C_{1-30}$ alkyl group, in that the dispersibility in a nonpolar solvent is excellent.

In the semiconductor nanoparticle complex according to the present invention, the mercapto fatty acid ester represented by general formula (1) preferably has a molecular weight of 450 or less.

In the semiconductor nanoparticle complex according to the present invention, the amount of the mercapto fatty acid ester represented by the general formula (1) contained in the entire ligand is preferably 40.0 mol % or more, more preferably 50.0 mol % or more, and further preferably 60. mol % or more. When the amount of the mercapto fatty acid ester contained in the entire ligand falls within the range above, the effect of reducing the rate of change of the fluorescent quantum yield after purification to that before purification of the semiconductor nanoparticle complex is enhanced.

In the semiconductor nanoparticle complex according to the present invention, the average SP value of the ligand coordinated to the semiconductor nanoparticle is preferably 9.30 or less. The SP value of the ligand can be calculated from the structural formula using the Y-MB method.

When different kinds of ligands are coordinated to the semiconductor nanoparticle, the SP value of each ligand is multiplied by the volume fraction of the ligand, and then the average SP value of the total ligands, which is obtained by summing up the multiplied values, is set as the SP value of the ligands. For example, when $P_1$ vol % of a ligand having an SP value $A_1$, $P_2$ vol % of a ligand having an SP value $A_2$, and the like are coordinated to the semiconductor nanoparticle, the average SP value of the total ligands is represented by the following formula (2).

$$\text{The average } SP \text{ value of total ligands} = \Sigma(Ai \times Pi/100) \quad (2)$$

In the semiconductor nanoparticle complex according to the present invention, it is preferable that the ligand further include an aliphatic ligand. The inclusion of the aliphatic ligand enhances the dispersibility in a nonpolar dispersion medium. Examples of the aliphatic ligand include aliphatic thiols, aliphatic carboxylic acids, aliphatic phosphines, aliphatic phosphine oxides, and aliphatic amines. In particular, the aliphatic ligand is preferably one or more kinds selected from the group consisting of aliphatic thiols, aliphatic carboxylic acids, and aliphatic phosphines in terms of the strength of coordination force to the semiconductor nanoparticle.

By having the configuration described above, the semiconductor nanoparticle complex according to the present invention has dispersibility in a nonpolar organic solvent and can keep high fluorescence quantum yield (QY) before and after purification.

In the semiconductor nanoparticle complex according to a first embodiment of the present invention, in the general formula (1), $R_1$ is a $C_{1-11}$ hydrocarbon group and $R_2$ is a $C_{1-20}$ hydrocarbon group, the mercapto fatty acid ester represented by the general formula (1) has an SP value of 9.30 or less, and the amount of the mercapto fatty acid ester represented by the general formula (1) contained in the entire ligand is 40.0 mol % or more. Specifically, the semiconductor nanoparticle complex according to the first embodiment of the present invention is a semiconductor nanoparticle complex in which a ligand is coordinated to a surface of a semiconductor nanoparticle. The semiconductor nanoparticle includes In and P. The ligand includes a mercapto fatty acid ester (hereinafter also referred to as mercapto fatty acid ester (1A)) in which $R_1$ is a $C_{1-11}$ hydrocarbon group and $R_2$ is a $C_{1-20}$ hydrocarbon group, among mercapto fatty acid esters represented by the general formula (1). The SP value of the mercapto fatty acid ester (1A) is 9.30 or less. The amount of the mercapto fatty acid ester (1A) contained in the entire ligand is 40.0 mol % or more.

The semiconductor nanoparticle complex according to the first embodiment of the present invention includes, as a ligand, the mercapto fatty acid ester (1A) in which $R_1$ is a $C_{1-11}$ hydrocarbon group and $R_2$ is a $C_{1-20}$ hydrocarbon group in the general formula (1), whereby the dispersibility in a nonpolar organic solvent is increased. In particular, when $R_1$ is a $C_{1-11}$ alkylene group and $R_2$ is a $C_{1-20}$ alkyl group in the mercapto fatty acid ester (1A), the dispersion of the semiconductor nanoparticle complex in a nonpolar solvent is facilitated.

The carbon number of $R_1$ in the mercapto fatty acid ester (1A) is 1 to 11, and preferably 2 to 6, $R_1$ is not limited as long as the carbon number is 1 to 11. Examples of linear groups thereof include an ethylene group, a propylene group, and a hexyl group, and examples of branched groups thereof include a 1,2-propylene group. The carbon number of $R_2$ in the mercapto fatty acid ester (1A) is 1 to 20, $R_2$ is not limited as long as the carbon number is 1 to 20. Examples of linear groups thereof include a methyl group, a hexyl group, an octyl group, a stearyl group, a palmityl group, and an eicosyl group, and examples of branched groups thereof include an ethylhexyl group and a 2-n-octyldodecyl group. The mercapto fatty acid ester (1A) is not limited as long as both $R_1$ and $R_2$ satisfy the carbon numbers described above, and examples thereof include isooctyl thioglycolate, tridecyl 3-mercaptopropionate, ethylhexyl 6-mercaptohexanoate, and methyl 11-mercaptoundecanoate.

In particular, in the semiconductor nanoparticle complex according to the first embodiment of the present invention, when the mercapto fatty acid ester (1A) is a mercapto fatty acid ester in which the carbon number of $R_2$ in general formula (1) is 14 to 20, the heat resistance of the semiconductor nanoparticle complex is increased, in addition to high dispersion of the semiconductor nanoparticle complex in a nonpolar solvent.

The SP value of the mercapto fatty acid ester (1A) is 9.30 or less, and preferably 7.00 to 9.20. With the SP value of the mercapto fatty acid ester (1A) within the range above, the dispersibility of the semiconductor nanoparticle complex in a nonpolar organic solvent is increased.

In the semiconductor nanoparticle complex according to the first embodiment of the present invention, the amount of the mercapto fatty acid ester (1A) contained in the entire ligand is 40.0 mol % or more, preferably 50.0 mol % or more, and more preferably 60.0 mol % or more. When the amount of the mercapto fatty acid ester (1A) contained in the entire ligand falls within the range above, the rate of change of the fluorescence quantum yield of the semiconductor nanoparticle complex after purification to that before purification can be reduced.

The molecular weight of the mercapto fatty acid ester (1A) is preferably 400 or less, more preferably 300 or less, and particularly preferably 80 to 300. With the molecular weight of the mercapto fatty acid ester (1A) within the range above, the semiconductor nanoparticle complex can be dispersed at a high concentration in a nonpolar solvent.

In the semiconductor nanoparticle complex according to the first embodiment of the present invention, the average SP value of the ligand coordinated to the semiconductor nanoparticle is preferably 9.30 or less. In the present invention, the SP value of the ligand can be calculated from the structural formula using the Y-MB method (this is applicable to the following).

When different kinds of ligands are coordinated to the semiconductor nanoparticle, the SP value of each ligand is multiplied by the volume fraction of the ligand, and then the average SP value of the total ligands, which is obtained by summing up the multiplied values, is set as the SP value of the ligands. For example, when $P_1$ vol % of a ligand having an SP value $A_1$, $P_2$ vol % of a ligand having an SP value $A_2$, and the like are coordinated to the semiconductor nanoparticle, the average SP value of total ligands is represented by the following formula (2).

$$\text{The average } SP \text{ value of total ligands} = \Sigma(Ai \times Pi/100) \quad (2)$$

In the semiconductor nanoparticle complex according to the first embodiment of the present invention, the mass ratio of the ligand to the semiconductor nanoparticle (ligand/semiconductor nanoparticle) is preferably 0.50 or less, and further preferably 0.40 or less. When the mass ratio of the ligand to the semiconductor nanoparticle (ligand/semiconductor nanoparticles) falls within the range above, the semiconductor nanoparticle complex can be dispersed at a high concentration in a nonpolar solvent.

In the semiconductor nanoparticle complex according to the first embodiment of the present invention, it is preferable that the ligand further include an aliphatic ligand. When the ligand includes an aliphatic ligand, the dispersibility of the semiconductor nanoparticle complex in a nonpolar dispersion medium can be increased. Examples of the aliphatic ligand include aliphatic thiols, aliphatic carboxylic acids, aliphatic phosphines, aliphatic phosphine oxides, and aliphatic amines. In particular, the aliphatic ligand is preferably one or more kinds selected from the group consisting of aliphatic thiols, aliphatic carboxylic acids, and aliphatic phosphines in terms of the strength of coordination force to the semiconductor nanoparticle.

Because of the configuration described above, the first semiconductor nanoparticle complex according to the present invention has high dispersibility in a nonpolar organic solvent, in addition to having dispersibility in a nonpolar organic solvent and keeping high fluorescence quantum yield (QY) before and after purification.

In the semiconductor nanoparticle complex according to a second embodiment of the present invention, in the general formula (1), $R_1$ is a $C_{1-11}$ hydrocarbon group and $R_2$ is a $C_{14-30}$ hydrocarbon group, and the SP value of the mercapto fatty acid ester represented by the general formula (1) is 9.00 or less. Specifically, the semiconductor nanoparticle complex according to the second embodiment of the present invention is a semiconductor nanoparticle complex in which a ligand is coordinated to a surface of a semiconductor nanoparticle. The semiconductor nanoparticle includes In and P. The ligand includes a mercapto fatty acid ester (hereinafter also referred to as mercapto fatty acid ester (1B)) in which $R_1$ is a $C_{1-11}$ hydrocarbon group and $R_2$ is a $C_{14-30}$ hydrocarbon group, among mercapto fatty acid esters represented by the general formula (1). The SP value of the mercapto fatty acid ester (1B) is 9.00 or less.

The semiconductor nanoparticle complex according to the second embodiment of the present invention includes, as a ligand, the mercapto fatty acid ester (1B) in which $R_1$ is a $C_{1-11}$ hydrocarbon group and $R_2$ is a $C_{14-30}$ hydrocarbon group in the general formula (1), whereby the heat resistance is increased. In particular, when $R_1$ is a $C_{1-11}$ alkylene group and $R_2$ is a $C_{14-30}$ alkyl group in the mercapto fatty acid ester (1), the heat resistance of the semiconductor nanoparticle complex is increased. The mercapto fatty acid ester (1B) in which $R_2$ has a carbon number within the range of 14 to 20 is equivalent to the mercapto fatty acid ester (1A).

The carbon number of $R_1$ in the mercapto fatty acid ester (1B) is 1 to 11, and preferably 2 to 11, $R_1$ is not limited as long as the carbon number is 1 to 11, and examples thereof include an ethylene group, a propylene group, and a hexyl group. The carbon number of $R_2$ in the mercapto fatty acid ester (1B) is 14 to 30, $R_2$ is not limited as long as the carbon number is 14 to 30. Examples of linear groups thereof include a stearyl group, a palmityl group, an eicosyl group, and an octacosyl group, and examples of branched groups thereof include a 2-n-octyldodecyl group. Examples of the mercapto fatty acid ester (1B) include stearyl 3-mercaptopropionate, palmityl 11-mercaptoundecanoate, and octacosyl 3-mercaptopropionate.

In particular, in the semiconductor nanoparticle complex according to the second embodiment of the present invention, when the mercapto fatty acid ester (1B) is a mercapto fatty acid ester in which the carbon number of $R_2$ in general formula (1) is 14 to 20, the dispersion of the semiconductor nanoparticle complex in a nonpolar solvent is increased, in addition to high heat resistance of the semiconductor nanoparticle complex.

The SP value of the mercapto fatty acid ester (1B) is 9.00 or less, and preferably 7.00 to 8.60. With the SP value of the mercapto fatty acid ester (1B) within the range above, the heat resistance of the semiconductor nanoparticle complex is increased.

In the semiconductor nanoparticle complex according to the second embodiment of the present invention, the amount of the mercapto fatty acid ester (1B) contained in the entire ligand is preferably 40.0 mol % or more, more preferably 50.0 mol % or more, and particularly preferably 60.0 mol % or more. When the amount of the mercapto fatty acid ester (1B) contained in the entire ligand falls within the range above, the rate of change of the fluorescence quantum yield of the semiconductor nanoparticle complex after purification to that before purification can be reduced.

The molecular weight of the mercapto fatty acid ester (1B) is preferably 300 to 500, and more preferably 350 to 450. With the molecular weight of the mercapto fatty acid ester (1B) within the range above, the semiconductor nanoparticle complex can be dispersed at a high concentration in a nonpolar solvent.

In the semiconductor nanoparticle complex according to the second embodiment of the present invention, the average SP value of the ligand coordinated to the semiconductor nanoparticle is preferably 9.30 or less. In the present invention, the SP value of the ligand can be calculated from the structural formula using the Y-MB method.

In the semiconductor nanoparticle complex according to the second embodiment of the present invention, it is preferable that the ligand further include an aliphatic ligand. When the ligand includes an aliphatic ligand, the dispersibility of the semiconductor nanoparticle complex in a nonpolar dispersion medium can be increased. Examples of the aliphatic ligand include aliphatic thiols, aliphatic carboxylic acids, aliphatic phosphines, aliphatic phosphine oxides, and aliphatic amines. In particular, the aliphatic ligand is preferably one or more kinds selected from the group consisting of aliphatic thiols, aliphatic carboxylic acids, and aliphatic phosphines in terms of the strength of coordination force to the semiconductor nanoparticle.

In the semiconductor nanoparticle complex according to the second embodiment of the present invention, in a heat resistance test in the air at 180±5° C. for five hours, the rate of change of fluorescence quantum yield after the heat resistance test to fluorescence quantum yield before the heat resistance test of the semiconductor nanoparticle complex ((1−(fluorescence quantum yield after the heat resistance test/fluorescence quantum yield before the heat resistance test))×100) is preferably less than 10%, and particularly preferably less than 5%.

Because of the configuration described above, the second semiconductor nanoparticle complex according to the present invention has high heat resistance, in addition to dispersibility in a nonpolar organic solvent and keeping high fluorescence quantum yield (QY) before and after purification.

In the semiconductor nanoparticle according to the present invention having the configuration described above, the rate of change of the fluorescence quantum yield of the semiconductor nanoparticle complex after purification to that before purification ((1−(fluorescence quantum yield after purification/fluorescence quantum yield before purification))×100) can be suppressed to less than 20%, and further to less than 10%.

The resistance against purification of the semiconductor nanoparticle complex according to the present invention (purification resistance) can be calculated by determining the fluorescence quantum yield for a dispersion liquid of the semiconductor nanoparticle complex before purification and a dispersion liquid of the semiconductor nanoparticle complex after purification. The fluorescence quantum yield is determined with the concentrations of the semiconductor nanoparticles in the dispersion liquids before purification and after purification adjusted to the same level with the fluorescence quantum yield before purification denoted by "QYa" and the fluorescence quantum yield after purification denoted by "QYb", the rate of change of the fluorescence quantum yield after purification to that before purification can be calculated by the following formula (3).

$$\{1-(QYb/QYa)\} \times 100 \quad (3)$$

The resistance against purification (purification resistance) can be calculated by the following formula (4).

$$(QYb/QYa) \times 100 \quad (4)$$

In other words, that the rate of change of the fluorescence quantum yield after purification to the fluorescence quantum yield before purification is lower than 10% means that the purification resistance is 90% or higher.

When the purification resistance of the semiconductor nanoparticle complex according to the present invention is 80% or higher, deterioration of the fluorescence quantum yield due to purification of the semiconductor nanoparticle complex can be suppressed.

A purification method for the semiconductor nanoparticle complex according to the present invention is a method involving aggregating the semiconductor nanoparticle complex according to the present invention using a poor solvent and subsequently separating the semiconductor nanoparticle complex.

In an embodiment, the semiconductor nanoparticle complex can be precipitated from a dispersion liquid by adding a polar conversion solvent such as acetone. The precipitated semiconductor nanoparticle complex can be collected by filtration or centrifugation, while a supernatant including the unreacted starting material and other impurities can be discarded or reused. Subsequently, the precipitated semiconductor nanoparticle complex can be washed with a further dispersion medium and dispersed again. This purification process can be repeated, for example, two to four times or until a desired purity is reached.

In the present invention, as the purification method for the semiconductor nanoparticle complex, in addition to the method described above, for example, aggregation, liquid-liquid extraction, distillation, electrodeposition, size exclusion chromatography, and/or ultrafiltration, and any methods can be used singly or in combination.

It is preferable that the semiconductor nanoparticle complex according to the present invention have the structure of the semiconductor nanoparticle complex of the present invention even after purification.

The fluorescence quantum yield (QY) after purification of the semiconductor nanoparticle complex according to the present invention is preferably 80% or higher, and more preferably 85% or higher. With the fluorescence quantum yield of the semiconductor nanoparticle complex after purification of 80% or higher, color conversion can be performed more efficiently when the semiconductor nanoparticle is used in applications.

(Semiconductor Nanoparticle Complex Dispersion Liquid)

The semiconductor nanoparticle complex according to the present invention can be dispersed in an organic dispersion medium to form a semiconductor nanoparticle complex dispersion liquid. In the present invention, a state in which the semiconductor nanoparticle complex is dispersed in a dispersion medium refers to a state in which the semiconductor nanoparticle complex is not precipitated or a state in which it does not remain as a visible turbidity (haze) when the semiconductor nanoparticle complex and the dispersion medium are mixed. The product in which the semiconductor nanoparticle complex is dispersed in a dispersion medium is referred to as the semiconductor nanoparticle complex dispersion liquid.

A semiconductor nanoparticle complex dispersion liquid according to the present invention is a semiconductor nanoparticle complex dispersion liquid in which the semiconductor nanoparticle complex according to the present invention is dispersed in an organic dispersion medium.

Examples of the organic dispersion medium that composes the semiconductor nanoparticle complex dispersion liquid according to the present invention is not limited as long as the semiconductor nanoparticle complex is dispersed, and examples thereof include organic solvents such as aliphatic hydrocarbons such as pentane, hexane, cyclohexane, isohexane, heptane, octane, hexadecane, and petroleum ether, alcohols such as methanol, ethanol, propanol, and butanol, ketones such as acetone, methyl ethyl ketone, and methyl isobutyl ketone, esters such as methyl acetate, ethyl acetate, propyl acetate, and butyl acetate, glycol ethers such as propylene glycol monomethyl ether, glycol ether esters such as propylene glycol monomethyl ether acetate, aromatic hydrocarbons such as benzene, toluene, xylene, and mineral spirits, alkyl halides such as dichloromethane, chloroform, and 1,2-dichlorobenzene, or a mixed solvent thereof.

The semiconductor nanoparticle complex according to the present invention has the configuration described above, whereby the semiconductor nanoparticle complex can be dispersed at a high mass fraction in a nonpolar dispersion medium, and consequently, the mass fraction of the semiconductor nanoparticles in the semiconductor nanoparticle complex dispersion liquid can be 15 mass % or more, further 20 mass % or more, further 25 mass % or more, and further 35 mass % or more.

In the present invention, a monomer can be selected as an organic dispersion medium of the semiconductor nanoparticle complex dispersion liquid according to the present invention. The monomer is preferably, but not limited to, a (meth)acrylic monomer by which applications of semiconductor nanoparticles can be selected widely. The (meth) acrylic monomer is selected from, depending on the applications of the semiconductor nanoparticle complex dispersion liquid, (meth)acrylic monomers such as methyl (meth)acrylate, ethyl (meth)acrylate, propyl (meth)acrylate, butyl (meth)acrylate, isobutyl (meth)acrylate, isoamyl (meth)acrylate, octyl (meth)acrylate, 2-ethylhexyl (meth) acrylate, dodecyl (meth)acrylate, isodecyl (meth)acrylate, lauryl (meth)acrylate, stearyl (meth)acrylate, cyclohexyl (meth)acrylate, isobornyl (meth)acrylate, 3,5,5-trimethylcyclohexanol (meth)acrylate, dicyclopentanyl (meth)acrylate, dicyclopentenyl (meth)acrylate, methoxyethyl (meth)acrylate, ethylcarbitol (meth)acrylate, methoxytriethylene glycol acrylate, 2-ethylhexyl diglycol acrylate, methoxypolyethylene glycol acrylate, methoxydipropylene glycol acrylate, phenoxyethyl (meth)acrylate, 2-phenoxydiethylene glycol (meth)acrylate, 2-phenoxypolyethylene glycol (meth)acrylate (n≈2), tetrahydrofurfuryl (meth)acrylate, 2-hydroxyethyl acrylate, 2-hydroxypropyl (meth)acrylate, 4-hydroxybutyl (meth)acrylate, 2-hydroxybutyl (meth)acrylate, dicyclopentanyloxyethyl (meth)acrylate, isobornyloxylethyl (meth)acrylate, adamantyl (meth)acrylate, dimethyladamantyl (meth)acrylate, dicyclopentenyloxyethyl (meth) acrylate, benzyl (meth)acrylate, ω-carboxypolycaprolactone (n≈2) monoacrylate, 2-hydroxy-3-phenoxypropyl acrylate, 2-hydroxy-3-phenoxyethyl (meth) acrylate, (2-methyl-2-ethyl-1,3-dioxolan-4-yl)methyl (meth)acrylate, (3-ethyloxetan-3-yl)methyl (meth)acrylate, o-phenylphenolethoxy (meth)acrylate, dimethylamino (meth)acrylate, diethylamino (meth)acrylate, 2-(meth)acryloyloxyethyl phthalate, 2-(meth)acryloyloxyethyl hexahydrophthalate, glycidyl (meth)acrylate, 2-(meth)acryloyloxyethyl phosphate, acryloylmorpholine, dimethyl acrylamide, dimethylaminopropyl acrylamide, isopropyl acrylamide, diethyl acrylamide, hydroxyethyl acrylamide, and N-acryloyloxyethyl hexahydrophthalimide. These may be used singly or may be used by mixing two or more kinds. In particular, the acrylic monomer is preferably one kind or a mixture of two or more kinds selected from lauryl (meth) acrylate and 1,6-hexanediol di(meth)acrylate, depending on the applications of the semiconductor nanoparticle complex dispersion liquid.

A prepolymer can be selected as the organic dispersion medium of the semiconductor nanoparticle complex dispersion liquid according to the present invention. Examples of the prepolymer include, but not limited to, acrylic resin prepolymers, silicone resin prepolymers, and epoxy resin prepolymers.

(Semiconductor Nanoparticle Complex Composition)

In the present invention, a semiconductor nanoparticle complex composition can be formed by selecting a monomer or a prepolymer as a dispersion medium of the semiconductor nanoparticle complex dispersion liquid. In other words, the semiconductor nanoparticle complex composition according to the present invention is a semiconductor nanoparticle complex composition in which the semiconductor nanoparticle complex according to the present invention is dispersed in a monomer or a prepolymer.

Examples of the monomer or the prepolymer include, but not limited to, radical polymerizable compounds including an ethylenic unsaturated bond, siloxane compounds, epoxy compounds, isocyanate compounds, and phenol derivatives.

Furthermore, the semiconductor nanoparticle complex composition according to the present invention may include a crosslinking agent. The crosslinking agent is selected from polyfunctional (meth)acrylates, polyfunctional silane compounds, polyfunctional amines, polyfunctional carboxylic acids, polyfunctional thiols, polyfunctional alcohols, polyfunctional isocyanates, and the like, depending on the kind of monomer in the semiconductor nanoparticle complex composition.

Furthermore, the semiconductor nanoparticle complex composition according to the present invention may further include a variety of organic solvents that do not influence curing, such as aliphatic hydrocarbons such as pentane, hexane, cyclohexane, isohexane, heptane, octane, and petroleum ethers, alcohols, ketones, esters, glycol ethers, glycol ether esters, aromatic hydrocarbons such as benzene, toluene, xylene, and mineral spirits, and alkyl halides such as dichloromethane and chloroform. The organic solvents above can be used not only for dilution of the semiconductor nanoparticle complex composition but also as an organic dispersion medium. In other words, the semiconductor nanoparticle complex according to the present invention can be dispersed in the organic solvents above to form a semiconductor nanoparticle complex dispersion liquid.

In addition, the semiconductor nanoparticle complex composition according to the present invention may include an initiator, a scattering agent, a catalyst, a binder, a surfactant, an adhesion promotor, an antioxidant, a UV absorber, an aggregation inhibitor, and a dispersant, as appropriate depending on the kind of monomer in the semiconductor nanoparticle complex composition.

Furthermore, the semiconductor nanoparticle complex composition according to the present invention may include a scattering agent in order to improve the optical properties of the semiconductor nanoparticle complex composition or a semiconductor nanoparticle complex cured film described later. The scattering agent is a metal oxide such as titanium oxide or zinc oxide, and the particle size thereof is preferably 100 nm to 500 nm. In view of the scattering effect, the particle size of the scattering agent is further preferably 200 nm to 400 nm. The inclusion of the scattering agent improves the absorbance roughly twice. The amount of the scattering agent included in the composition is preferably 2 mass % to 30 mass %, and more preferably 5 mass % to 20 mass % in view of retaining the pattern characteristics of the composition.

With the configuration of the semiconductor nanoparticle complex according to the present invention, the mass fraction of semiconductor nanoparticles in the semiconductor nanoparticle complex composition can be 30 mass % or more. When the mass fraction of semiconductor nanoparticles in the semiconductor nanoparticle complex composition is 30 mass % to 95 mass %, the semiconductor nanoparticle complex and the semiconductor nanoparticles can be dispersed at a high mass fraction even in the cured film described later.

When the semiconductor nanoparticle complex composition according to the present invention is formed in a film of 10 μm, the absorbance for light having a wavelength of 450 nm normal to the film is preferably 1.0 or more, more preferably 1.3 or more, and further preferably 1.5 or more. With this, light from a backlight can be efficiently absorbed, so that the thickness of the cured film described later can be reduced to miniaturize devices in applications.

(Diluted Composition)

A diluted composition is produced by diluting the semiconductor nanoparticle complex composition according to the present invention with an organic solvent.

Examples of the organic solvent for diluting the semiconductor nanoparticle complex composition include, but not limited to, aliphatic hydrocarbons, alcohols, ketones, esters, glycol ethers, glycol ether esters, aromatic hydrocarbons such as benzene and toluene, and alkyl halides.

(Semiconductor Nanoparticle Complex Cured Film)

In the present invention, a semiconductor nanoparticle complex cured film refers to a film containing the semiconductor nanoparticle complex and being cured. The semiconductor nanoparticle complex cured film can be obtained by curing the semiconductor nanoparticle complex composition or the diluted composition into a film.

The semiconductor nanoparticle complex cured film according to the present invention is a semiconductor nanoparticle complex cured film in which the semiconductor nanoparticle complex according to the present invention is dispersed in a polymer matrix. In other words, the semiconductor nanoparticle complex cured film according to the present invention includes a semiconductor nanoparticle, a ligand coordinated to a surface of the semiconductor nanoparticle, and a polymer matrix.

Examples of the polymer matrix include, but not limited to, (meth)acrylic resins, silicone resins, epoxy resins, silicone resins, maleic resins, butyral resins, polyester resins, melamine resins, phenolic resins, and polyurethane resins. The semiconductor nanoparticle complex cured film may be obtained by curing the semiconductor nanoparticle complex composition. The semiconductor nanoparticle complex cured film may further include a crosslinking agent.

The film can be cured by, but not limited to, any methods suitable for the composition forming a film, such as thermal treatment and ultraviolet treatment.

The semiconductor nanoparticle and the ligand coordinated to the surface of the semiconductor nanoparticle that are included in the semiconductor nanoparticle complex cured film preferably constitute the semiconductor nanoparticle complex. The semiconductor nanoparticle complex included in the semiconductor nanoparticle complex cured film according to the present invention is configured as described above, whereby the semiconductor nanoparticle complex can be dispersed at a higher mass fraction in the cured film.

Furthermore, since the semiconductor nanoparticle complex cured film according to the present invention contains the semiconductor nanoparticle complex having high luminous properties, the semiconductor nanoparticle complex cured film having high luminous properties can be provided. The fluorescence quantum yield of the semiconductor nanoparticle complex is preferably 70% or higher, and further preferably 80% or higher.

The thickness of the semiconductor nanoparticle complex cured film is preferably 50 μm or less, more preferably 20 μm or less, and further preferably 10 μm or less, in order to miniaturize the devices employing the semiconductor nanoparticle complex cured film.

(Semiconductor Nanoparticle Complex Patterning Film and Display Device)

A semiconductor nanoparticle complex patterning film can be obtained by patterning the semiconductor nanoparticle complex composition or the diluted composition into a film. The method of patterning the semiconductor nanoparticle complex composition and the diluted composition is not limited, and examples thereof include spin coating, bar coating, inkjet, screen printing, and photolithography.

A display device is formed using the semiconductor nanoparticle complex patterning film. For example, a display device having excellent fluorescence quantum yield can be provided by using the semiconductor nanoparticle complex patterning film as a wavelength conversion layer.

The configurations and/or methods described in the present description are illustrated by way of example and susceptible to a number of modifications, and it is understood that these specific examples or examples should not be taken in any limitative sense. The specific procedure or method described in the present description may represent one of a number of process methods. Various actions explained and/or described can be performed in the order of description and/or explanation, or can be omitted. Similarly, the order of the method can be changed.

The subject of the present disclosure includes all novel and non-obvious combinations and subsidiary combinations of a variety of methods, systems, and configurations disclosed in the present description as well as other features, functions, actions, and/or characteristics, and all equivalents thereof.

EXAMPLES

Although the present invention will be described in detail below with examples and comparative examples, the present invention is not limited to these examples.

Example 1

A semiconductor nanoparticle complex was produced according to the following method.

<Production of Core Particles>

Indium acetate (0.3 mmol) and zinc oleate (0.6 mmol) were added to a mixture of oleic acid (0.9 mmol), 1-dodecanethiol (0.1 mmol), and octadecene (10 mL), and the mixture was heated under vacuum (<20 Pa) to about 120° C. and allowed to react for one hour. The mixture allowed to react under vacuum was introduced into a nitrogen atmosphere at 25° C., and after addition of tris(trimethylsilyl)phosphine (0.2 mmol), heated to about 300° C. and allowed to react for 10 minutes. The reaction liquid was cooled to 25° C., and octanoic acid chloride (1.1 mmol) was injected. The liquid was heated at about 250° C. for 30 minutes, followed by cooling to 25° C. to obtain a dispersion liquid of InP-based semiconductor nanoparticles.

(Precursors for Shell Forming)

In production of a shell, the following precursors were first prepared.

(Preparation of Zn Precursor Solution)

A Zn precursor of [Zn]=0.4 M was prepared by mixing 40 mmol of zinc oleate and 75 mL of octadecene and heating the mixture under vacuum at 110° C. for one hour.

(Preparation of Se Precursor (Trioctylphosphine Selenide))

Trioctylphosphine selenide of [Se]=2.2 M was produced by mixing 22 mmol of selenium powder and 10 mL of trioctylphosphine in nitrogen and stirring the mixture until completely dissolved.

(Preparation of S Precursor (Trioctylphosphine Sulfide))

Trioctylphosphine sulfide of [S]=2.2 M was produced by mixing 22 mmol of sulfur powder and 10 mL of trioctylphosphine in nitrogen and stirring the mixture until completely dissolved.

Using the precursors obtained as described above, a shell was formed on the surface of the InP-based semiconductor nanoparticle (core) as follows.

(Formation of Shell)

A dispersion liquid of the core was heated to 200° C. At 250° C., the dispersion liquid was added to 6.0 mL of the Zn precursor solution and 2.0 mL of trioctylphosphine selenide and the mixture was allowed to react for 30 minutes to form a ZnSe shell on a surface of the InP-based semiconductor nanoparticle. Furthermore, 4.0 mL of the Zn precursor solution and 1.8 mL of trioctylphosphine sulfide were added, and the temperature was increased to 280° C. to allow the solution to react for one hour to form a ZnS shell. The reaction solution was cooled to room temperature and, with addition of 200 mL of dehydrated acetone in a nitrogen atmosphere, stirred for 30 minutes. This solution was left to stand for 30 minutes, and the supernatant was removed by cannulation. The organic phase including the semiconductor nanoparticles left in the flask was diluted using 5 mL of octadecene.

The resultant semiconductor nanoparticle was observed by STEM-EDS, and the presence of a core/shell structure was confirmed.

(Production of Single Ligand)

(Method of Preparing 2-Ethylhexyl 6-Mercaptohexanoate)

In a flask, 5.9 g of 6-mercaptohexanoic acid (40 mmol), 6.2 g of 2-ethylhexanol (48 mmol), 100 mL of toluene, and 0.2 g of concentrated sulfuric acid were mixed in a nitrogen atmosphere. A Dean-Stark apparatus was attached to the flask, and the solution was allowed to react for 24 hours while being stirred at 110° C. The reaction solution was cooled to room temperature and then washed using saturated sodium bicarbonate water, water, and saturated saline water successively. The resultant organic phase was dried using magnesium sulfate and then filtered and concentrated by evaporation. This concentrate was purified by column chromatography with hexane and ethyl acetate as a developing solvent to obtain a ligand of interest (2-ethylhexyl 6-mercaptohexanoate).

(Method of Preparing Methyl 11-Mercaptoundecanoate)

In a flask, 8.7 g of 11-mercaptoundecanoic acid (40 mmol), 26.0 g of methanol (200 mmol), and 0.2 g of concentrated sulfuric acid were mixed in a nitrogen atmosphere. While being heated to reflux at 65° C., the solution was stirred and allowed to react for 24 hours. The reaction solution was cooled to room temperature and then dissolved in chloroform and washed using saturated sodium bicarbonate water, water, and saturated saline water successively. The resultant organic phase was dried using magnesium sulfate and then filtered and concentrated by evaporation to obtain a ligand of interest (methyl 11-mercaptoundecanoate).

(Method of Preparing Hexyl 3-Mercaptopropionate)

In a flask, 4.2 g of 3-mercaptopropionic acid (40 mmol), 4.9 g of 1-hexanol (48 mmol), 100 mL of toluene, and 0.2 g of concentrated sulfuric acid were mixed in a nitrogen atmosphere. The pressure was reduced to 30 mmHg or lower to allow the solution to react for 24 hours. The reaction solution was cooled to room temperature and then dissolved in toluene and washed using saturated sodium bicarbonate water, water, and saturated saline water successively. The resultant organic phase was dried using magnesium sulfate, and then the organic phase was filtered and concentrated by evaporation. This concentrate was purified by column chromatography with hexane and ethyl acetate as a developing solvent to obtain a ligand of interest (hexyl 3-mercaptopropionate).

(Method of Preparing Palmityl 11-Mercaptoundecanoate)

In a flask, 8.7 g of 11-mercaptoundecanoic acid (40 mmol), 6.2 g of palmityl alcohol (48 mmol), and 0.2 g of concentrated sulfuric acid were mixed in a nitrogen atmosphere. While the solution was stirred at 60° C., the pressure was reduced to 30 mmHg or lower to allow the solution to react for 24 hours. The reaction solution was cooled to room temperature and then dissolved in toluene and washed using saturated sodium bicarbonate water, water, and saturated saline water successively. The resultant organic phase was dried using magnesium sulfate, and then the organic phase was filtered and concentrated by evaporation. This concentrate was purified by column chromatography with hexane and ethyl acetate as a developing solvent to obtain a ligand of interest (palmityl 11-mercaptoundecanoate).

(Method of Preparing Octacosyl 3-Mercaptopropionate)

In a flask, 4.2 g of 3-mercaptopropionic acid (40 mmol), 19.7 g of 1-octacosanol (48 mmol), and 0.2 g of concentrated sulfuric acid were mixed in a nitrogen atmosphere. While the solution was stirred at 60° C., the pressure was reduced to 30 mmHg or lower to allow the solution to react for 24 hours. The reaction solution was cooled to room temperature and then dissolved in toluene and washed using saturated sodium bicarbonate water, water, and saturated saline water successively. The resultant organic phase was dried using magnesium sulfate, and then the organic phase was filtered and concentrated by evaporation. This concentrate was purified by column chromatography with hexane and ethyl acetate as a developing solvent to obtain a ligand of interest (octacosyl 3-mercaptopropionate).

(Production of Semiconductor Nanoparticle Complex)

In a flask, a semiconductor nanoparticle 1-octadecene dispersion liquid was prepared by dispersing the purified semiconductor nanoparticles in the amount of 10 mass % by mass ratio in 1-octadecene. In a flask, 10.0 g of the prepared semiconductor nanoparticle 1-octadecene dispersion liquid was charged, and 1.8 g of isooctyl thioglycolate (from Tokyo Chemical Industry Co., Ltd.) as a mercapto fatty acid ester and 0.2 g of dodecanethiol as an aliphatic ligand were added. The mixture was stirred in a nitrogen atmosphere at 110° C. for 60 minutes and cooled to 25° C. to obtain a semiconductor nanoparticle complex. The reaction solution including the semiconductor nanoparticle complex was put into a centrifuge tube and centrifuged at 4,000 G for 20 minutes to separate into a transparent 1-octadecene phase and a semiconductor nanoparticle complex phase. The 1-octadecene phase was removed, and the remaining semiconductor nanoparticle complex phase was collected.

(Fluorescence Quantum Yield Measurement)

The optical properties of the semiconductor nanoparticle complex were determined using a quantum yield measurement system (QE-2100 from Otsuka Electronics Co., Ltd.). The semiconductor nanoparticle complex obtained by synthesis was dispersed in a dispersion medium, and the dispersion liquid was irradiated with single light of 450 nm as excitation light to obtain an emission spectrum. The re-excitation fluorescence emission spectrum of re-excited fluorescence emission was eliminated from the obtained emission spectrum, and the fluorescence quantum yield (QY) and the full width at half maximum (FWHM) were calculated from the emission spectrum after the re-excitation correction. Octadecene was used as a dispersion medium.

Furthermore, to the resultant semiconductor nanoparticle complex phase, 5.0 mL of acetone was added to produce a dispersion liquid. To the resultant dispersion liquid, 50 mL of n-hexane was added, and the dispersion liquid was centrifuged at 4,000 G for 20 minutes. After the centrifugation, a transparent supernatant was removed, and a precipitate was collected. This operation was repeated three times to obtain a purified semiconductor nanoparticle complex. The purified semiconductor nanoparticle complex was dispersed in a dispersion medium and irradiated with single light of 450 nm as excitation light to obtain an emission spectrum. The re-excitation fluorescence emission spectrum of re-excited fluorescence emission was eliminated from the obtained emission spectrum, and the fluorescence quantum yield (QY) was calculated from the emission spectrum after the re-excitation correction. At this moment, measurement was performed by adjusting the absorbance to the same level with that of a dispersion liquid of the semiconductor nanoparticle complex before purification.

The purification resistance was calculated from the fluorescence quantum yield of the semiconductor nanoparticle complex before and after purification.

The determined fluorescence quantum yield, the rate of change before and after purification, and the purification resistance were listed in Table 2.

The rate of change before and after purification (%)=(1−(fluorescence quantum yield after purification/fluorescence quantum yield before purification))×100

Purification resistance (%)=(fluorescence quantum yield after purification/fluorescence quantum yield before purification)×100

($^1$H-NMR Measurement)

For the purified semiconductor nanoparticle complex, the ligands coordinated to the semiconductor nanoparticle were analyzed using a nuclear magnetic resonance (NMR) spectrometer (JNM-LA400 manufactured by JEOL Ltd.). In the measurement of all the samples, using deuterated chloroform as a solvent and tetramethylsilane as an internal standard substance for chemical shift, $^1$H-NMR was measured. A signal attributed to the alkyl group of dodecanethiol was observed in the vicinity of 0.8 to 1.6 ppm and a signal attributed to the polyethylene glycol skeleton was observed in the vicinity of 3.5 to 4.0 ppm from the semiconductor nanoparticle complex obtained in Synthesis Example 1. The abundance ratio of each ligand was calculated based on the area ratio of these signals. Based on the abundance ratio of each ligand, the average SP value of total ligands and the amount of mercapto fatty acid ester to the total ligands (mol ratio) were calculated. The obtained results were listed in Table 1.

(Thermogravimetric Analysis)

The purified semiconductor nanoparticle complex was heated to 550° C. by simultaneous thermogravimetry/differential thermal analysis (DTA-TG), held for 10 minutes, and cooled. The residual mass after analysis was considered as the mass of the semiconductor nanoparticles, and based on this value, the mass ratio of the semiconductor nanoparticles to the semiconductor nanoparticle complex was determined.

(Heat Resistance Test)

After the solvent was removed from the dispersion liquid of the semiconductor nanoparticle complex after purification, the semiconductor nanoparticle complex was put into a thermostatic bath (DN411H manufactured by Yamato Scientific Co., Ltd.), and a heat resistance test was conducted in the air at 180±5° C. for five hours. Subsequently, the fluorescence quantum yield of the semiconductor nanoparticle complex after the heat resistance test was determined. At that moment, the fluorescence quantum yield of the semiconductor nanoparticle complex before the heat resistance test was determined.

The rate of change before and after the heat resistance test was calculated from the fluorescence quantum yield of the semiconductor nanoparticle complex before and after the heat resistance test.

The obtained fluorescence quantum yield after the heat resistance test and the rate of change before and after the heat resistance test were listed in Table 2.

The rate of change before and after the heat resistance test (%)=(1−(fluorescence quantum yield after the heat resistance test/fluorescence quantum yield before the heat resistance test))×100

(Dispersibility Test)

With reference to the mass ratio, an organic dispersion medium was added to the semiconductor nanoparticle complex so that the concentration of semiconductor nanoparticles was 15 mass %, 20 mass %, 30 mass %, and 40 mass %, and the dispersion state at that moment was observed. Those dispersed were denoted by ○ and those with precipitation and fog observed were denoted by x in Table 2. N-hexane was used as a dispersion medium.

In evaluation of the dispersibility, when the semiconductor nanoparticles were dispersed at a concentration of 15 mass %, it is determined that dispersion in a nonpolar organic solvent is possible, and when the semiconductor nanoparticles were dispersed even at a concentration of 20 mass %, it is determined that the dispersibility in a nonpolar organic solvent is high.

Example 2

A semiconductor nanoparticle complex was obtained by the same method as in Example 1 except that 1.8 g of tridecyl 3-mercaptopropionate (manufactured by FUJIFILM Wako Pure Chemical Corporation) was used as a mercapto fatty acid ester and that 0.2 g of trioctylphosphine was used as an aliphatic ligand in the process of producing a semiconductor nanoparticle complex.

Example 3

A semiconductor nanoparticle complex was obtained by the same method as in Example 1 except that 1.6 g of 2-ethylhexyl 6-mercaptohexanoate was used as a mercapto fatty acid ester and that 0.4 g of dodecanethiol was used as an aliphatic ligand in the process of producing a semiconductor nanoparticle complex.

Example 4

A semiconductor nanoparticle complex was obtained by the same method as in Example 1 except that 1.6 g of methyl 11-mercaptoundecanoate was used as a mercapto fatty acid ester and that 0.2 g of oleic acid was used as an aliphatic ligand in the process of producing a semiconductor nanoparticle complex.

Example 5

A semiconductor nanoparticle complex was obtained by the same method as in Example 1 except that 1.5 g of 2-ethylhexyl 3-mercaptopropionate (manufactured by Tokyo Chemical Industry Co., Ltd.) was used as a mercapto fatty acid ester and that 0.5 g of dodecanethiol was used as an aliphatic ligand in the process of producing a semiconductor nanoparticle complex.

Example 6

A semiconductor nanoparticle complex was obtained by the same method as in Example 1 except that 1.1 g of 2-ethylhexyl thioglycolate (manufactured by Tokyo Chemical Industry Co., Ltd.) was used as a mercapto fatty acid ester and that 0.9 g of dodecanethiol was used as an aliphatic ligand in the process of producing a semiconductor nanoparticle complex.

Example 7

A semiconductor nanoparticle complex was obtained by the same method as in Example 1 except that 1.8 g of isooctyl thioglycolate was used as a mercapto fatty acid ester and that 0.2 g of 6-mercaptohexanol was used as an aliphatic ligand in the process of producing a semiconductor nanoparticle complex.

Example 8

A semiconductor nanoparticle complex was obtained by the same method as in Example 1 except that 1.8 g of hexyl 3-mercaptopropionate was used as a mercapto fatty acid ester and that 0.2 g of oleic acid was used as an aliphatic ligand in the process of producing a semiconductor nanoparticle complex.

Example 9

A semiconductor nanoparticle complex was obtained by the same method as in Example 1 except that 2.7 g of stearyl 3-mercaptopropionate (manufactured by FUJIFILM Wako Pure Chemical Corporation) was used as a mercapto fatty acid ester and that 0.3 g of oleic acid was used as an aliphatic ligand in the process of producing a semiconductor nanoparticle complex.

Example 10

A semiconductor nanoparticle complex was obtained by the same method as in Example 1 except that 3.6 g of palmityl 11-mercaptoundecanoate was used as a mercapto fatty acid ester and that 0.4 g of oleic acid was used as an aliphatic ligand in the process of producing a semiconductor nanoparticle complex.

Example 11

A semiconductor nanoparticle complex was obtained by the same method as in Example 1 except that in the shell forming reaction, a ZnSe shell was formed, followed by cooling to room temperature without adding the Zn precursor solution and trioctylphosphine sulfide.

Example 12

A semiconductor nanoparticle complex was obtained by the same method as in Example 1 except that 1.3 g of isooctyl thioglycolate was used as a mercapto fatty acid ester and that 0.7 g of benzenethiol was used instead of an aliphatic ligand in the process of producing a semiconductor nanoparticle complex.

Example 13

A semiconductor nanoparticle complex was obtained by the same method as in Example 1 except that 0.9 g of isooctyl thioglycolate was used as a mercapto fatty acid ester and that 1.1 g of dodecanethiol was used as an aliphatic ligand in the process of producing a semiconductor nanoparticle complex.

Example 14

A semiconductor nanoparticle complex was obtained by the same method as in Example 1 except that no mercapto fatty acid ester was added and that 2.0 g of dodecanethiol was used as an aliphatic ligand in the process of producing a semiconductor nanoparticle complex.

Example 15

In the process of producing a semiconductor nanoparticle complex, 1.6 g of ethyl 3-mercaptopropionate (manufactured by Tokyo Chemical Industry Co., Ltd.) was used as a mercapto fatty acid ester and 0.4 g of dodecanethiol was used as an aliphatic ligand, and the mixture was stirred in a nitrogen atmosphere at 110° C. for 60 minutes and cooled to 25° C. The reaction solution including the semiconductor nanoparticle complex was put into a centrifuge tube and centrifuged at 4,000 G for 20 minutes to separate into a transparent octadecene phase and a semiconductor nanoparticle complex phase. The semiconductor nanoparticle complex was collected, and the fluorescence quantum yield was measured in the form of a chloroform dispersion liquid. To the semiconductor nanoparticle complex obtained by synthesis, 5.0 mL of acetone was added to produce a dispersion liquid. To the resultant dispersion liquid, 50 mL of n-hexane was added, and the dispersion liquid was centrifuged at 4,000 G for 20 minutes. After the centrifugation, a transparent supernatant was removed, and a precipitate was collected. This operation was repeated three times to obtain a purified semiconductor nanoparticle complex. The fluorescence quantum yield of the purified semiconductor nanoparticle complex was determined in the form of a chloroform dispersion liquid.

Example 16

A semiconductor nanoparticle complex was obtained by the same method as in Example 1 except that 3.2 g of octacosyl 3-mercaptopropionate was used as a mercapto fatty acid ester and that 0.8 g of dodecanethiol was used as an aliphatic ligand in the process of producing a semiconductor nanoparticle complex.

Example 17

A semiconductor nanoparticle complex was obtained by the same method as in Example 1 except that 0.7 g of isooctyl thioglycolate was used as a mercapto fatty acid ester and that 1.3 g of dodecanethiol was used as an aliphatic ligand in the process of producing a semiconductor nanoparticle complex.

Example 18

A semiconductor nanoparticle complex was obtained by the same method as in Example 1 except that 1.6 g of eicosyl 3-mercaptopropionate was used as a mercapto fatty acid ester and that 0.4 g of dodecanethiol was used as an aliphatic ligand in the process of producing a semiconductor nanoparticle complex.

Example 19

A semiconductor nanoparticle complex was obtained by the same method as in Example 1 except that 1.6 g of tetracosyl 3-mercaptopropionate was used as a mercapto fatty acid ester and that 0.4 g of dodecanethiol was used as an aliphatic ligand in the process of producing a semiconductor nanoparticle complex.

Example 20

A semiconductor nanoparticle complex was obtained by the same method as in Example 1 except that 1.6 g of 2-n-octyldodecyl 3-mercaptopropionate was used as a mercapto fatty acid ester and that 0.4 g of dodecanethiol was used as an aliphatic ligand in the process of producing a semiconductor nanoparticle complex.

The meaning of the abbreviations used in Table 1 to Table 2 is as follows.
MPAE: mercapto fatty acid ester
QD: semiconductor nanoparticle
DDT: dodecanethiol
TOP: trioctylphosphine

TABLE 1

| | Semiconductor nanoparticle | | | | | | | | |
|---|---|---|---|---|---|---|---|---|---|
| | | Semiconductor nanoparticle complex | | | | | | | |
| | | Ligand | | Molecular weight | | SP VALUE | | | |
| | Semiconductor structure | MPAE | Aliphatic ligand | MPAE | Aliphatic ligand or other ligands | MPAE | Aliphatic ligand or other ligands | Total ligand average | MPAE/TOTAL LIGAND [mol %] | Ligand/QD [mass ratio] |
| Example 1 | InP/ZnSe/ZnS | Isooctyl thioglycolate | DDT | 204 | 202 | 8.84 | 8.31 | 8.79 | 89.9 | 0.27 |
| Example 2 | InP/ZnSe/ZnS | Tridecyl 3-mercaptopropionate | TOP | 288 | 371 | 8.64 | 7.61 | 8.53 | 92.0 | 0.39 |
| Example 3 | InP/ZnSe/ZnS | Ethylhexyl 6-mercaptohexanoate | DDT | 260 | 202 | 8.63 | 8.31 | 8.56 | 75.7 | 0.33 |
| Example 4 | InP/ZnSe/ZnS | Methyl 11-mercapto-undecanoate | Oleic acid | 232 | 283 | 8.74 | 8.58 | 8.71 | 82.9 | 0.33 |
| Example 5 | InP/ZnSe/ZnS | Ethylhexyl 3-mercaptopropionate | DDT | 218 | 202 | 8.92 | 8.31 | 8.77 | 73.6 | 0.28 |
| Example 6 | InP/ZnSe/ZnS | Ethylhexyl thioglycolate | DDT | 204 | 202 | 8.99 | 8.31 | 8.69 | 54.8 | 0.27 |
| Example 7 | InP/ZnSe/ZnS | Isooctyl thioglycolate | 6-Mercapto-hexanol | 204 | 202 | 8.84 | 10.79 | 9.03 | 89.9 | 0.25 |
| Example 8 | InP/ZnSe/ZnS | Hexyl 3-mercaptopropionate | Oleic acid | 190 | 283 | 9.30 | 8.58 | 9.23 | 93.0 | 0.25 |
| Example 9 | InP/ZnSe/ZnS | Stearyl 3-mercaptopropionate | Oleic acid | 359 | 283 | 8.44 | 8.58 | 8.45 | 87.6 | 0.43 |
| Example 10 | InP/ZnSe/ZnS | Palmityl 11-mercapto-undecanoate | Oleic acid | 443 | 283 | 8.20 | 8.58 | 8.24 | 85.2 | 0.54 |
| Example 11 | InP/ZnSe | Isooctyl thioglycolate | DDT | 204 | 202 | 8.84 | 8.31 | 8.79 | 89.9 | 0.28 |
| Example 12 | InP/ZnSe/ZnS | Isooctyl thioglycolate | Benzenethiol | 204 | 111 | 8.84 | 8.31 | 8.66 | 50.2 | 0.25 |
| Example 13 | InP/ZnSe/ZnS | Isooctyl thioglycolate | DDT | 204 | 202 | 8.84 | 8.31 | 8.55 | 44.8 | 0.25 |
| Example 14 | InP/ZnSe/ZnS | None | DDT | — | 202 | — | 8.31 | 8.31 | 0.0 | 0.28 |
| Example 15 | InP/ZnSe/ZnS | Ethyl 3-mercaptopropionate | DDT | 134 | 202 | 9.95 | 8.31 | 9.63 | 85.8 | 0.22 |
| Example 16 | InP/ZnSe/ZnS | Octacosyl 3-mercaptopropionate | DDT | 499 | 202 | 8.16 | 8.31 | 8.19 | 61.9 | 0.59 |
| Example 17 | InP/ZnSe/ZnS | Isooctyl thioglycolate | DDT | 204 | 202 | 8.84 | 8.31 | 8.50 | 34.8 | 0.28 |
| Example 18 | InP/ZnSe/ZnS | Eicosyl 3-mercaptopropionate | DDT | 387 | 202 | 8.32 | 8.31 | 8.32 | 80.0 | 0.40 |
| Example 19 | InP/ZnSe/ZnS | Tetracosyl 3-mercaptopropionate | DDT | 443 | 202 | 8.22 | 8.31 | 8.24 | 81.0 | 0.51 |
| Example 20 | InP/ZnSe/ZnS | 2-N-octyldodecyl 3-mercaptopropionate | DDT | 387 | 202 | 8.39 | 8.31 | 8.37 | 79.0 | 0.41 |

*MPAE/total ligand: the amount of mercapto fatty acid ester contained in the entire ligand (mol %)
*Ligand/QD: mass ratio of ligand to semiconductor nanoparticle

TABLE 2

| | Optical properties | | | | | | | | | |
|---|---|---|---|---|---|---|---|---|---|---|
| | Fluorescence quantum yield | | | Heat resistance | | | | | | |
| | Before purification [%] | After purification [%] | Rate of change before and after purification [%] | Purification resistance [%] | QY after heat resistance [%] | Rate of change [%] | Full width at half maximum nm | Dispersibility test Hexane | | | |
| | | | | | | | | 15 wt % | 20 wt % | 30 wt % | 40 wt % |
| Example 1 | 90 | 90 | 0 | 100 | 73 | 19 | 35 | ○ | ○ | ○ | ○ |
| Example 2 | 91 | 90 | 1 | 99 | 78 | 13 | 34 | ○ | ○ | ○ | ○ |
| Example 3 | 90 | 88 | 2 | 98 | 79 | 11 | 35 | ○ | ○ | ○ | ○ |
| Example 4 | 90 | 86 | 4 | 96 | 71 | 18 | 34 | ○ | ○ | ○ | ○ |
| Example 5 | 89 | 88 | 1 | 99 | 73 | 17 | 35 | ○ | ○ | ○ | ○ |
| Example 6 | 90 | 82 | 9 | 91 | 67 | 19 | 35 | ○ | ○ | ○ | ○ |
| Example 7 | 91 | 90 | 1 | 99 | 74 | 18 | 35 | ○ | ○ | ○ | x |
| Example 8 | 92 | 90 | 2 | 98 | 75 | 17 | 35 | ○ | ○ | ○ | ○ |
| Example 9 | 89 | 90 | −1 | 101 | 88 | 2 | 35 | ○ | ○ | ○ | x |
| Example 10 | 89 | 90 | −1 | 101 | 87 | 3 | 35 | ○ | ○ | x | x |
| Example 11 | 81 | 66 | 19 | 81 | 54 | 19 | 34 | ○ | ○ | ○ | ○ |
| Example 12 | 80 | 71 | 11 | 89 | 58 | 18 | 35 | ○ | ○ | x | x |
| Example 13 | 90 | 74 | 18 | 82 | 60 | 19 | 34 | ○ | ○ | ○ | ○ |
| Example 14 | 90 | 65 | 28 | 72 | 60 | 8 | 34 | ○ | ○ | ○ | ○ |
| Example 15 | 85 | 80 | 6 | 94 | Not measured due to dispersion failure | | 35 | x | x | x | x |
| Example 16 | 86 | 80 | 7 | 93 | 77 | 4 | 35 | ○ | x | x | x |
| Example 17 | 91 | 70 | 23 | 77 | 57 | 19 | 35 | ○ | ○ | ○ | ○ |
| Example 18 | 92 | 91 | 1 | 99 | 89 | 2 | 35 | ○ | ○ | x | x |
| Example 19 | 92 | 90 | 2 | 98 | 88 | 2 | 35 | ○ | x | x | x |
| Example 20 | 91 | 91 | 0 | 100 | 88 | 3 | 35 | ○ | ○ | x | x |

The invention claimed is:

1. A semiconductor nanoparticle complex composition comprising a semiconductor nanoparticle complex, the semiconductor nanoparticle complex comprising a ligand coordinated to a surface of a semiconductor nanoparticle, wherein
the semiconductor nanoparticle includes In and P, the ligand includes a mercapto fatty acid ester represented by the following general formula (1), the mercapto fatty acid ester has an SP value of 9.30 or less,
an amount of the mercapto fatty acid ester represented by the general formula (1) contained in the entire ligand is 40.0 mol % or more, and
a mass ratio of the ligand to the semiconductor nanoparticle (ligand/semiconductor nanoparticle) is 0.50 or less:
general formula (1):

$$HS-R_1-COOR_2 \quad (1)$$

(where $R_1$ is a $C_{1-11}$ hydrocarbon group and $R_2$ is a $C_{1-20}$ hydrocarbon group),
wherein the semiconductor nanoparticle complex is dispersed in a dispersion medium, wherein the dispersion medium is a monomer or a prepolymer.

2. The semiconductor nanoparticle complex composition according to claim 1, wherein in the general formula (1), $R_1$ is a $C_{1-11}$ alkylene group and $R_2$ is a $C_{1-20}$ alkyl group.

3. The semiconductor nanoparticle complex composition according to claim 1, wherein the mercapto fatty acid ester represented by the general formula (1) has a molecular weight of 400 or less.

4. The semiconductor nanoparticle complex composition according to claim 1, wherein the semiconductor nanoparticle is a core-shell type semiconductor nanoparticle having a core containing In and P as main components and one or more layers of shells.

5. The semiconductor nanoparticle complex composition according to claim 4, wherein at least one of the shells is formed of ZnSe.

6. The semiconductor nanoparticle complex composition according to claim 1, wherein an average SP value of the ligand coordinated to the semiconductor nanoparticle is 9.30 or less.

7. The semiconductor nanoparticle complex composition according to claim 1, wherein the ligand further includes an aliphatic ligand.

8. The semiconductor nanoparticle complex composition according to claim 7, wherein the aliphatic ligand is one or more kinds selected from the group consisting of aliphatic thiols, aliphatic carboxylic acids, and aliphatic phosphines.

9. The semiconductor nanoparticle complex composition according to claim 1, wherein a rate of change of fluorescence quantum yield after purification to fluorescence quantum yield before purification of the semiconductor nanoparticle complex ((1−(fluorescence quantum yield after purification/fluorescence quantum yield before purification))×100) is less than 20%.

10. The semiconductor nanoparticle complex composition according to claim 1, wherein fluorescence quantum yield after purification of the semiconductor nanoparticle complex is 80% or higher.

11. The semiconductor nanoparticle complex composition according to claim 1, wherein a full width at half maximum of an emission spectrum of the semiconductor nanoparticle complex is 38 nm or less.

12. A semiconductor nanoparticle complex dispersion liquid comprising the semiconductor nanoparticle complex composition according to claim 1 dispersed in an organic dispersion medium.

* * * * *